Patented July 11, 1944

2,353,229

UNITED STATES PATENT OFFICE 2,353,229

HYDROGENATION OF OIL

Maurice M. Durkee, Decatur, Ill., assignor to A. E. Staley Manufacturing Company, Decatur, Ill., a corporation of Delaware No Drawing. Application October 3, 1941, Serial No. 413,484

6 Claims. (Cl. 260—409)

This invention relates to improvements in hydrogenation of oils. More particularly, it relates to a process of selective hydrogenation to produce a non-reverting comestible soybean oil, or the like, having enhanced keeping and other favorable qualities.

For many years crude soybean oil has been an article of commerce, most of which was imported in a refined state, being used largely with other vegetable oils such as linseed oil for industrial purposes. Prior to the last decade, however, during a period of scarcity of edible oils and fats, much of the crude soybean oil was refined for use as an edible salad oil. However, the resulting purified oil very quickly acquired disagreeable odors and flavors which have been described as "grassy," "painty" and even "fishy." Since that time the domestic soybean crop has grown to considerable proportion and while much of the soybean oil made therefrom was consumed for industrial purposes it more recently has been refined for use as a salad oil with such variations as were found suitable in refining this type of oil. This domestic oil when refined in accordance with conventional procedure often proved to be sweet and bland when freshly produced but finally acquired the undesirable flavors and odors characteristic of the imported oil. This change in flavor, characteristic of soybean oil, became known in the trade as "reversion." This flavor change is to be distinguished from that change ordinarily referred to in oils as "rancidity."

There has been speculation among edible oil and fat technologists concerning the cause of reversion, particularly since the development of the crude domestic type of soybean oil and since its attempted use as a suitable comestible oil. One of the theories concerning this reversion is that it is the result of some undesirable constituent not entirely removed in refining and the most frequently mentioned of such constituents are the phospho-lipides.

I have held the view that this reversion which causes the undesirable flavors and odors is caused by the presence of about 3 to 5 per cent of linolenic acid glyceride, a naturally occurring constituent of soybean oil. It is noteworthy that neither corn nor cottonseed oil contain this fatty acid and do not exhibit reversion characteristics. I have obtained excellent verification of this theory based on the discovery that artificial soybean oil made from a combination of linseed oil and corn oil, to contain about the same amount of unsaturated glycerides as does soybean oil, shows that it has the characteristic soybean reversion behavior. Coupled with these facts, the present invention is based on the discovery that the conversion of the linolenic acid by partial hydrogenation within confined limits of temperature and pressure and proper treatment with hydrogen in surface contact only of the oil will bring about a sufficient drop in iodine number to cure the reverting characteristics.

The iodine number of an oil is commonly used to indicate the suitability of an oil to "dry" to a film and may be determined, for example, by the Wijs analytical method. If the iodine number of the oil is over 130 it is usually considered to be in the drying class. However, iodine numbers are not definitely fixed for any particular oil for they will vary slightly to some extent between known pure samples of the same oil.

Since the time domestic crude soybean oil has been available fairly satisfactory comestible soybean oil has been produced but after a sufficient time the undesirable flavors and odors characteristic of refined imported soybean oil would develop.

It has been suggested heretofore that suitable edible soybean oil could be made by treatment with heat under pressure and special kinds of catalysts by bubbling hydrogen gas through the oil. With these methods stirring is practiced until a considerable drop in iodine number has been reached.

In accordance with the principles of the present invention many of the foregoing and other disadvantages have been overcome and it is a principal object, generally, of the present invention to substantially completely convert the linolenic glycerides of such oils to oleic or linoleic glycerides.

More specifically, it is an object of the present invention to provide a process for the production of a comestible soybean oil which prevents the formation of disagreeable and unpalatable odors and flavors.

Another object of the invention is to produce a comestible soybean oil which remains sweet and bland when freshly produced by eliminating substantially all of the reversion products or converting them to other more palatable substances.

A further object of the invention is the provision of a process which will convert the triple bond fractions of unsaturated triglycerides to lower degrees of unsaturation.

Still another object of the invention is to provide a process for the production of a comestible soybean oil or the like wherein an exceedingly small amount of catalyst is used with a relatively high amount of pressure in the form of hydrogen gas which is introduced above the surface level of the oil only.

These and other objects of the invention will in part be obvious and will in part appear hereinafter.

The invention accordingly comprises the several steps and the relation of one or more of such steps with respect to each of the others thereof which will be exemplified in the process hereinafter disclosed, and the scope of the application, which will be indicated in the claims.

Briefly, the procedure in refining vegetable oils to produce salad oils may be outlined as follows:

The crude oil is neutralized by treating it with a predetermined excess of caustic soda or potash lye over the amount required to neutralize the acidic substances present either in a refining kettle or in a mixing device. The quality of the crude oil determines the strength of the lye, time of mixing, rate of stirring, and degree of heat applied. In this step the major impurities are coagulated in the form of an impure soap and allowed to settle or are preferably removed from the mixture by centrifugal clarification. It is important that as much of the residual soap as possible be removed at this point. The neutralized oil is then washed at least twice with a portion of hot water containing a minimum of inorganic impurities and for this purpose it is preferred that distilled or a specially softened water be used, for example, as that obtained by means of the zeolite water softening process. After each washing the water is separated by high speed centrifugals. The next step is to dry the hot oil from the washing centrifugal and inasmuch as it still contains about ⅓ per cent of water this is done by evaporating the water by passing the oil through a vacuum chamber. The oil is next bleached by decolorization and this is accomplished by treating it in a vacuum tank with a mixture of fuller's earth, activated carbon and other adsorbents which, at fairly high temperatures, have the property of removing color as well as residual traces of other impurities. The spent bleaching ingredients may be separated by filtration.

Before the next succeeding and final steps of winterization and deodorization the oil is hydrogenated in accordance with the principles of the present invention hereinafter more fully set forth. It should be understood that any suitable variation in steps of refining commonly used may be employed up to the point of hydrogenation. When the final product of the hydrogenation is obtained it is winterized by chilling and filtering to remove any remaining waxes, stearines and any other substances which can be precipitated by low temperatures and which might otherwise affect the clarity of the oil. This winterization or purification step may be followed by suitable filtration. The deodorization step is perhaps one of the most difficult and important in routine procedure. In it the oil is heated to a high temperature under a high vacuum while a finely divided stream of superheated steam is passed therethrough. In the case of soybean oil I have found that prolonged treatment is often required, sometimes 50 per cent longer than that required by corn oil which is ordinarily considered one of the difficult oils to deodorize. The oil may then be cooled under a vacuum and after final filtration through paper it is ready for use.

It might well be emphasized at this point that in order to secure good flavor and odor in the finished oil it is necessary that the alkali refined and bleached oil contain as little as possible of dissolved soap from the refining procedure. I prefer to employ bleached soybean oil for my process which contains less than 15 parts per million of soap. I also prefer to select a bleached oil preferably with a color of less than 3 red on the Lovibond scale. It should be noted that if an unbleached oil is used the final product is very green in color, quite similar in appearance to olive oil. The deep green shade is possibly due to some compound of nickel with the coloring matter of the oil. Careful analysis in such instances shows that there is about ½ part per million of nickel in the dark green oil and half that much or about ¼ part per million in an oil that has been bleached prior to hydrogenation.

Generally, the present invention contemplates the treatment of such an oil with a small amount of catalyst within a range of 0.001 per cent to 0.02 per cent, a temperature range of 130° C. to 180° C., and a pressure range of 5 pounds to 30 pounds. This is accompanied by suitable agitation to a point where whipping or spraying is avoided. Preferably a vacuum is created initially above the surface of the oil. Subsequently, hydrogen is introduced into the evacuated space above the oil and the foregoing conditions are maintained for a period of time until the iodine value has dropped 2 to 4 points and in any event until the total iodine value still is above 125. It has been found that such oil has excellent keeping qualities and does not revert. It should also be noted that to carry the oil below the 125 value I have found may result in an oil which has a tallowy or gassy odor and flavor; but in any event will not withstand the cold test prescribed for salad and cooking oils. Preferably, a Raney type catalyst is used as prepared in accordance with his disclosure, for example, in patents, Nos. 1,563,587; 1,628,190; 1,915,473. The amounts of catalysts called for are of this type of catalyst and if other types of catalysts are to be used percentages may be varied slightly.

As an example of the process contemplated by the present invention 1,000 parts of soybean oil were placed in a cold hydrogenator and treated with 0.15 part (0.002 per cent Ni) of catalyst containing 13.5 per cent nickel. The oil catalyst mixture was agitated with a propeller type agitator turning at 500 to 550 R. P. M. and the mixture was heated to 150° to 160° C. The air was withdrawn from the hydrogenator before any heat was applied and the apparatus was held under vacuum during the heating period to prevent any oxidation of the oil. After the oil had reached a temperature of 150° C. the exhaust line was closed and hydrogen introduced into the evacuated portion of the hydrogenator above the surface of the oil and a pressure of 5 pounds was maintained. The oil temperature immediately increased 5° to 10° C. due to heat of reaction. The apparatus was held at the increased temperature at 5 pounds pressure for at least 3 hours with the exhaust closed until an iodine number not below 125 had been reached.

Other similar runs were made using 0.001 per cent nickel with pressures of 5 to 30 pounds at an operating time of 3 to 6 hours and longer. It should be noted that the operating time increases as the amount of catalyst is decreased.

On the other hand I have found on larger scale runs that with each increase in the amount of oil being hydrogenated a corresponding increase in the amount of catalyst is necessary. For example, when work was done on a scale 400 times larger than that given in the above example the amount of catalyst there used (0.002 per cent Ni) had to be multiplied by 3, i. e., actually it is about 0.006 per cent nickel. On this basis, it will be necessary, within the limits of full capacity equipment to use in the neighborhood of 0.01 per cent nickel or even 0.02 per cent nickel but the latter figure would be an outside limit.

From the foregoing, as well as other plant demonstrations, it has been observed that the following conditions are essential to the production of a selectively hydrogenated soybean oil of good odor and flavor that will pass the cold test:

(1) The bleached oil must be low in residual soap.

(2) The catalyst must be properly prepared and a small amount within the range heretofore specified, namely, 0.001 per cent to 0.02 per cent is adequate.

(3) Maximum agitation is desirable and should be short of the point where it does not cause whipping of the oil or any spray above the surface because too rapid agitation decreases the selectivity of the process. In this case it should be understood that the size of the impeller blades, if that type of agitator is employed, should be proportional to the type and size of the hydrogenator in which it is used. Obviously no standard rate of R. P. M. can arbitrarily be stated which will accommodate large and small size hydrogenators with equal facility.

(4) Gas pressure must be maintained by the addition of the hydrogen gas above the surface only. Bubbling of gas through the oil prevents the desired selectivity.

(5) The time of hydrogenation should be long enough to give a drop in iodine number not exceeding 4 points and without the formation of saturated glycerides.

(6) The deodorization temperature should be high enough to remove traces of hydrogenation odor and flavor with a minimum degree of molecular rearrangement. This temperature is usually around 255° to 265° C.

The hydrogenated oil produced under such conditions will remain clear at 0° C. for a longer period of time than will regular soybean oil. However, when this oil is deodorized the oil will cloud at this temperature more quickly. The molecular rearrangement responsive for this peculiar behavior is not known, but to illustrate, hydrogenated and ordinary soybean oil were placed in an ice bath at 0° C. The ordinary oil clouded at 48 hours and the selectively hydrogenated oil before deodorization clouded at 72 hours and the same oil after deodorization clouded at 21 hours. A salad oil which will remain clear and brilliant at 0° C. for 5½ hours is considered satisfactory. By means of the present invention soybean oil can be kept clear in this manner at 0° C. for 21 hours. This oil when stored after deodorizing will not acquire the characteristic reversion flavor. The iodine number of this oil is preferably dropped 2 to 4 points.

It should be noted that the deodorized oil has a better initial odor, flavor and cooking odor. It does not revert but may become rancid under proper conditions. Mayonnaise made in the laboratory from this hydrogenated oil did not develop the characteristic disagreeable flavor found in that made from the regular soybean oils. The fact that rancidity does occur in such selectively hydrogenated oils is not necessarily a ground for assuming that the grassy, fishy or painty odors have not been eliminated because there is no connection between the rancidity characteristics and the reversion characteristics. An analysis of the selectively hydrogenated oil using the modified hexabromide method shows that the linolenic glyceride has been substantially entirely eliminated.

As heretofore emphasized I have found that it is necessary to introduce the hydrogen gas above the surface of the oil. Even a slight amount of hydrogen gas bubbling through the oil brings about the formation of easily crystallizable glycerides which destroy the usefulness of the oil as a salad oil when practicing the invention in accordance with the present disclosure. In this respect the stirring or agitation was also found to be of importance in that this operation should be as intense as possible without causing whipping at the surface of the oil. Under these conditions there is apparently a speed of flow of the surface film inside the apparatus which brings about the greatest selectivity. It may be that under the conditions herein set forth a principle of "starvation" of the oil for the hydrogen is being employed so that at any given instant an amount of gas is present with the nickel in an active form only great enough to combine with the glyceride containing 3 double bonds.

While the present invention is intended particularly to be adapted to the treatment of soybean oil it is also contemplated that other triglycerides generally may be selectively treated to convert certain of the unsaturated glycerides to lower unsaturates to produce a comestible oil or for any other suitable purposes.

It will thus be seen that the objects hereinbefore set forth may be readily and efficiently attained and since certain changes may be made in carrying out the above process without departing from the scope of the invention it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The process of producing a non-reverting comestible soybean oil by selective hydrogenation, which comprises in combination, treating said oil in an hydrogenator with a nickel catalyst in an amount not greater than 0.02 per cent by weight of the oil, agitating the treated oil at a rate suitable to prevent spraying, creating a vacuum in said hydrogenator above the level of the oil, applying heat to the oil and maintaining the vacuum to prevent oxidation of the oil until said oil has reached a temperature of about 130° C., introducing a stream of hydrogen into the hydrogenator above the surface of the oil at a pressure of at least 5 pounds to increase the temperature of the oil not exceeding 180° C., and maintaining said conditions for at least 3 hours until an iodine value not less than 125 for said oil is attained.

2. The process of producing a non-reverting comestible soybean oil by selective hydrogenation, which comprises in combination, treating said oil in an hydrogenator with a suitable catalyst of not less than 0.001 per cent and not more than 0.02 per cent by weight of said oil, rapidly agitating the treated oil at a rate short of the spraying point, creating a vacuum in said hydrogenator above the oil level, applying heat to the oil not less than 130° C. and not more than 180° C., maintaining the vacuum over said oil and thereafter introducing a stream of hydrogen above the surface of the oil at a pressure of not less than 5 pounds and not greater than 30 pounds for a period of time not less than 3 hours and not exceeding 12 hours until an iodine value not less than 125 for said oil has been attained.

3. The process of producing a non-reverting comestible soybean oil by selective hydrogenation, which comprises, treating said oil in an hydrogenator with a suitable catalyst of about 0.006 per cent by weight of said oil, agitating the treated oil at a rate suitable to prevent whipping, creating a vacuum in said hydrogenator, applying heat to the oil and maintaining the vacuum until a temperature of at least 130° C. has been reached, introducing a stream of hydrogen into the hydrogenator above the surface of the oil at a pressure not exceeding 30 pounds, and maintaining said conditions for at least 3 hours until an iodine value not less than 125 for said oil has been reached.

4. The process of producing a non-reverting comestible soybean oil by selective hydrogenation, which comprises treating said oil in an hydrogenator with a suitable catalyst not exceeding 0.02 per cent by weight of the oil, agitating the treated oil at a rate suitable to prevent spraying, creating a vacuum above the oil level, heating the oil to between 130° C. to 180° C., introducing hydrogen above the surface of the oil and under pressure, and maintaining said conditions until an iodine number not less than 125 for said oil has been reached.

5. The process of producing a non-reverting comestible soybean oil by selective hydrogenation, which comprises, treating said oil in an hydrogenator with a suitable selective catalyst within the range of 0.001 to 0.02 per cent based on the weight of the oil, agitating the treated oil at a rate which will prevent spraying, creating a vacuum in said hydrogenator above the oil level, applying heat to the oil until a temperature between 130° C. and 180° C. has been reached, maintaining an atmosphere of hydrogen above the surface of the oil and maintaining said conditions until an iodine value not less than 125 for said oil has been reached.

6. The process of producing a non-reverting comestible soybean oil by selective hydrogenation, which comprises, treating said oil in an hydrogenator with a suitable selective catalyst within the range of 0.001 to 0.02 per cent based on the weight of the oil, agitating the treated oil at a rate which will prevent spraying, creating a vacuum in said hydrogenator above the oil level, applying heat to the oil until a temperature between 130° C. and 180° C. has been reached, introducing a stream of hydrogen into the vacuum area above the surface of the oil until an iodine value not less than 125 for said oil, and deodorizing said oil.

MAURICE M. DURKEE.